United States Patent [19]
Han

[11] Patent Number: 5,814,809
[45] Date of Patent: *Sep. 29, 1998

[54] APPARATUS FOR OPTICALLY SCANNING IMAGES USING TRANSMISSIVE AND REFLECTIVE LIGHT SOURCES

[75] Inventor: Loi Han, Alhambra, Calif.

[73] Assignee: Microtek International, Inc., Hsinchu, Taiwan

[ * ] Notice: The term of this patent shall not extend beyond the expiration date of Pat. No. 5,574,274.

[21] Appl. No.: 692,540

[22] Filed: Aug. 5, 1996

Related U.S. Application Data

[63] Continuation-in-part of Ser. No. 393,112, Feb. 21, 1995, Pat. No. 5,574,274.

[51] Int. Cl.⁶ ....................................................... H04N 1/04
[52] U.S. Cl. .......................... 250/208.1; 250/234; 358/474
[58] Field of Search ................................ 250/208.1, 234, 250/235; 358/474, 487, 493, 494, 505, 506, 508, 513

[56] References Cited

U.S. PATENT DOCUMENTS

| | | | |
|---|---|---|---|
| 4,879,604 | 11/1989 | Koshiyouji | 358/474 |
| 4,989,099 | 1/1991 | Koshiyouji et al. | 358/474 |
| 5,140,443 | 8/1992 | Iwahara et al. | 358/474 |
| 5,282,081 | 1/1994 | Chen et al. | 358/474 |
| 5,457,547 | 10/1995 | Yamada | 358/487 |
| 5,574,274 | 11/1996 | Rubley et al. | 250/208.1 |

*Primary Examiner*—Stephone B. Allen
*Attorney, Agent, or Firm*—Small, Larkin & Kidde

[57] ABSTRACT

An optical scanning apparatus for retrieving digital electronic images representative of opaque and transmissive objects. The apparatus is equipped with a docking port and is operative to scan objects, such as documents and photographs and/or transparencies and slides. A scanning camera equipped with transmissive and reflective light sources for illuminating the corresponding objects may be selected by the operator to retrieve images of either the reflective or transmissive object type.

20 Claims, 12 Drawing Sheets

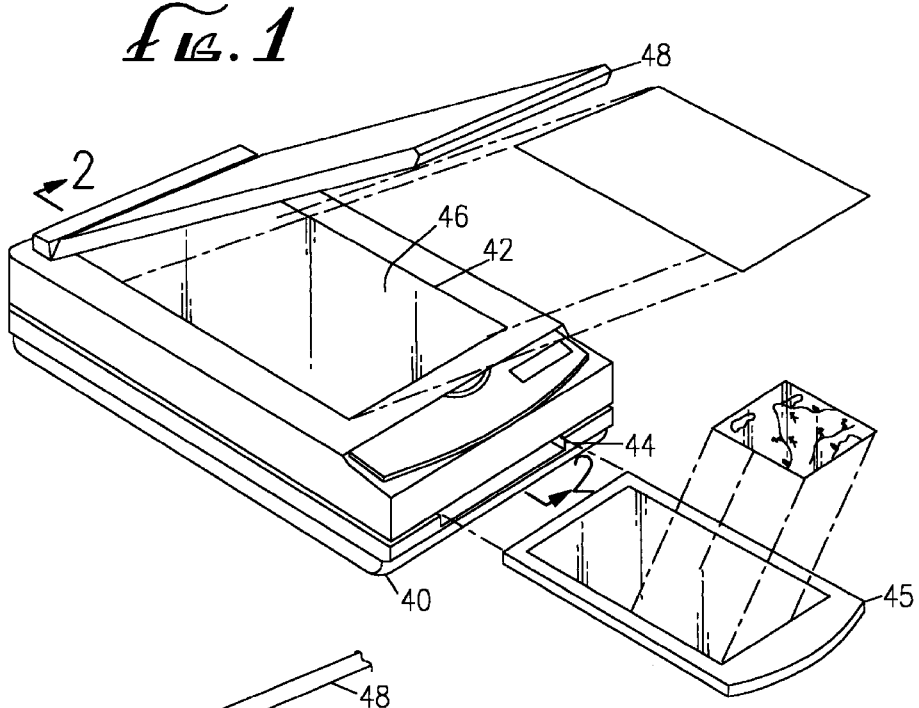
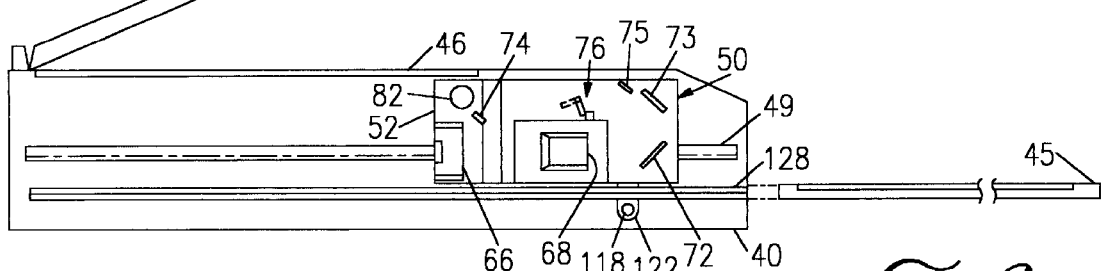

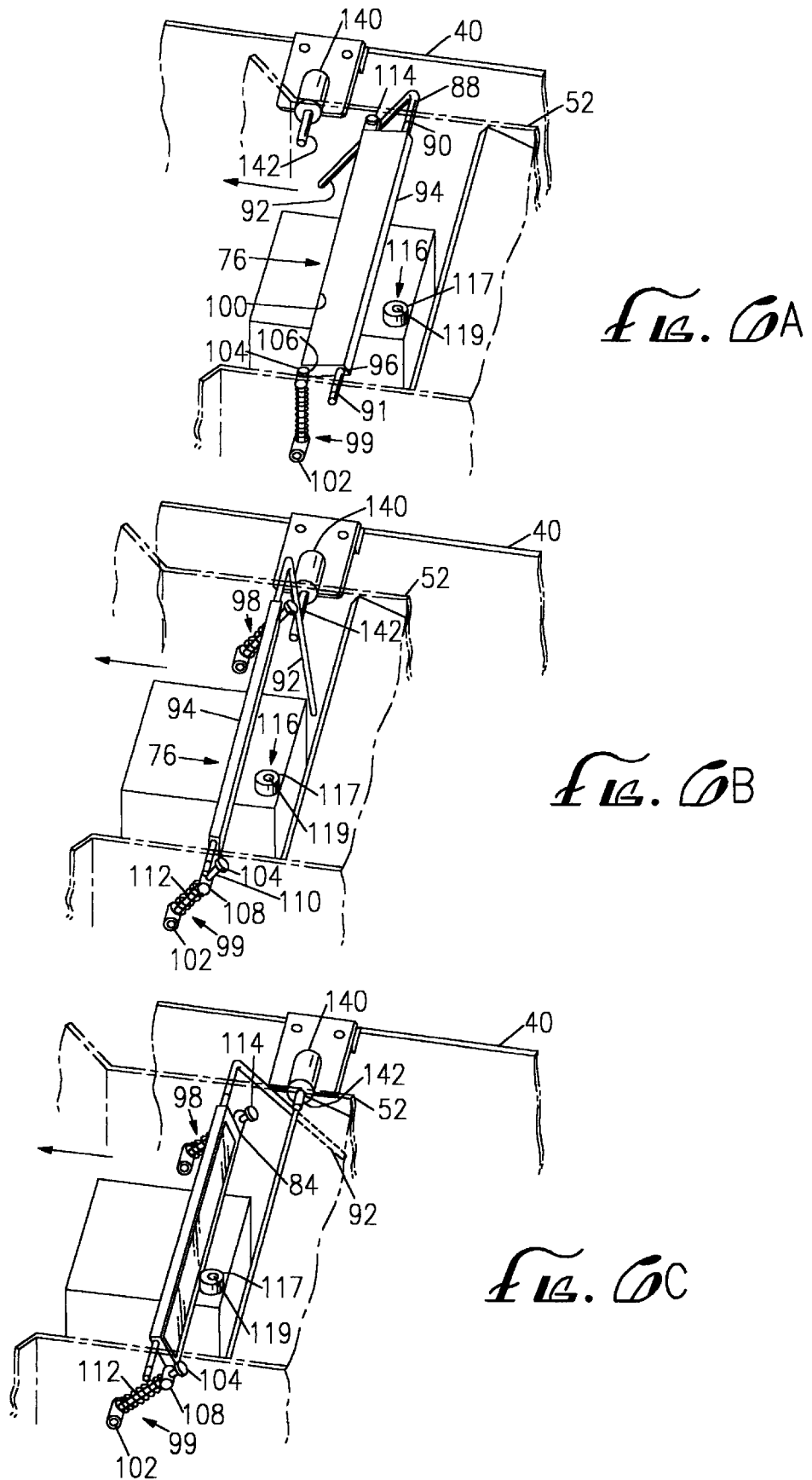

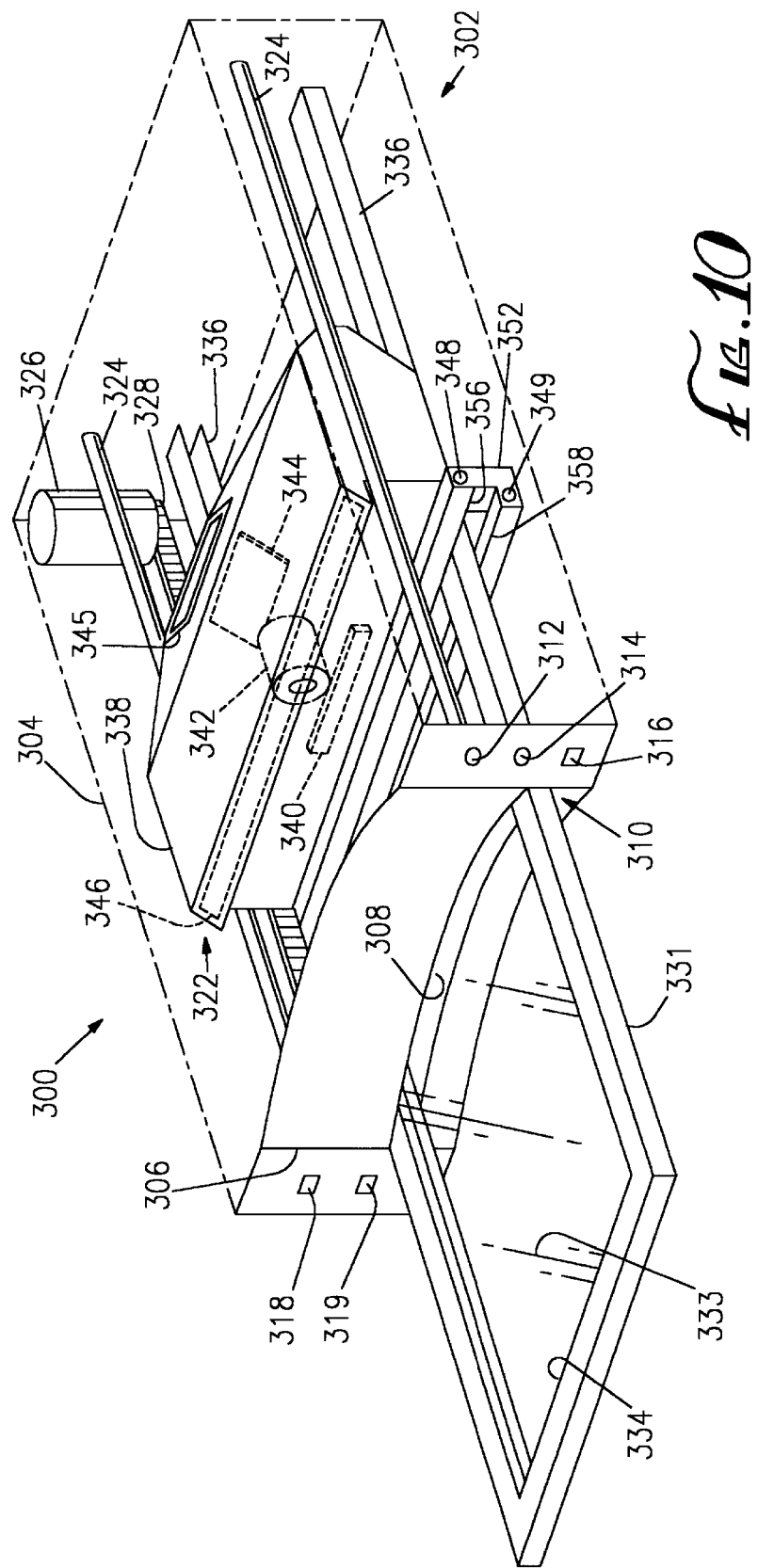

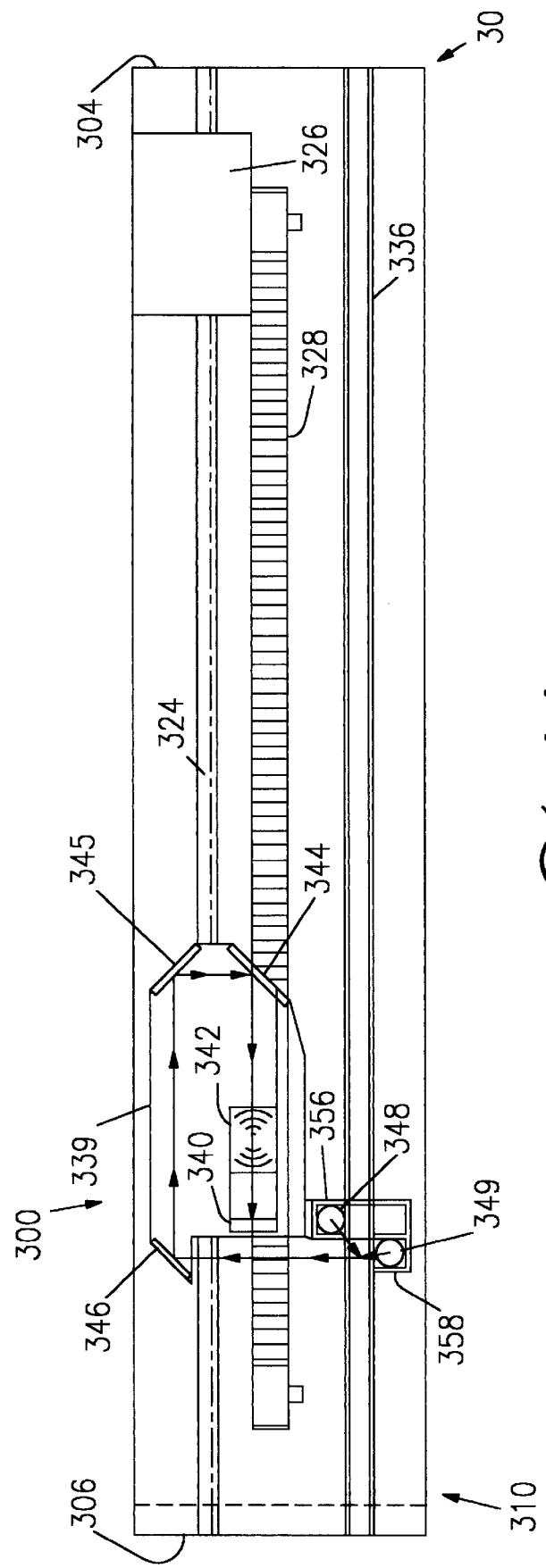

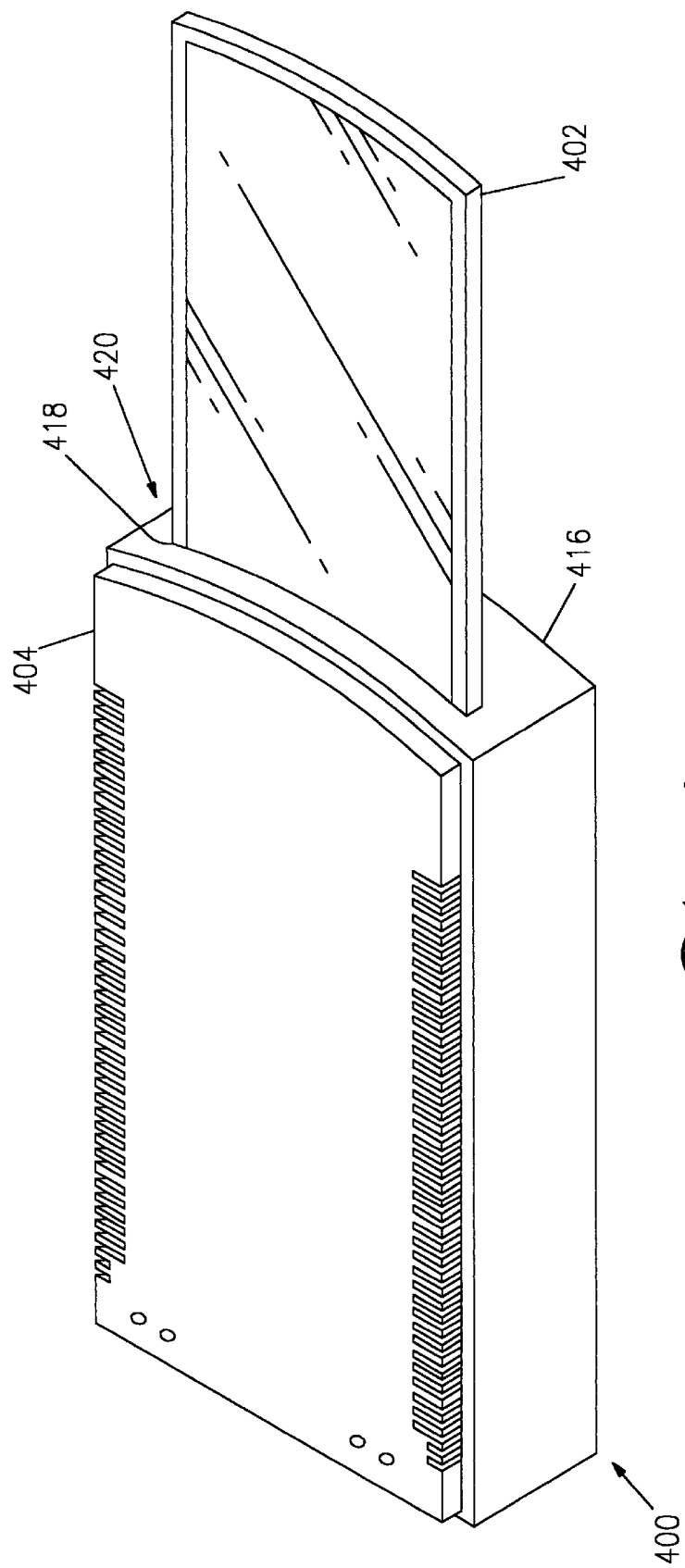

APPARATUS FOR OPTICALLY SCANNING IMAGES USING TRANSMISSIVE AND REFLECTIVE LIGHT SOURCES

This application is a CIP of Ser. No. 08/393,112, filed Feb. 21, 1995, now U.S. Pat. No. 5,574,276.

BACKGROUND OF THE INVENTION

1. Field of the Invention

The present invention relates to an optical scanning apparatus and more particularly to a transmissive and reflective optical scanning apparatus.

2. Description of the Related Art

Recent developments in the use of high speed, low cost digital electronic imaging systems to process, transmit and display digital information have substantially increased the demand for optical scanners to convert information into a digital electronic form. A variety of optical scanners, including facsimile machines and digital copiers, have been developed to meet this growing demand. The optical scanners generally fall within two categories, reflective scanners for opaque objects, such as documents and photographs, and transmissive scanners for transparent objects, such as slides and transparencies. Reflective scanners, used with opaque objects, project light onto the side of the object to be scanned. The object illuminated by the reflected light is then viewed by a digital camera which converts the image into a digital electronic form. Transmissive scanners, used with transparent objects, project light through the object to be scanned. The transmissive object is also viewed by a digital camera to then be stored in a digital electronic form. The growing demand for both reflective and transmissive scanners has resulted in a need for scanners to provide both capabilities.

Present dual scanner designs, as illustrated in FIG. 7, utilize a conventional reflective base scanner 20. This type of scanner includes a digital camera and a reflective light source (not shown) mounted on rails and driven by a motor within the base housing to scan along the length of the document. The light source projects light upon the portion of the object within the field of view of the camera. Documents and photographs are placed on a glass platen 22. The light source and camera move incrementally lengthwise across a document under the glass platen to scan in an image line by line. This conventional reflective scanner design has been modified with the addition of a second light source 24 for transmissive objects. This light is preferably housed behind a second glass platen 26 within a lid 28 which overlies the base 20. The light source 24 is movably mounted on a pair of rails and wired electronically to the reflective scanner base to provide light through a portion of a transmissive object within the field of view of the camera. The transmissive light source mechanism includes a motor 28 to maintain the light directly within the camera's field of view by incrementally moving along the rails in the lid in synchronous movement with the camera.

In order to obtain the best picture quality from the design presently used. The light source located in the lid must be maintained in synchronous alignment with the camera at all times during scanning. The electronic communication between the lid light source and the scanner base is necessary to maintain synchronous movement. Thus in addition to a second drive mechanism such a scanner requires additional electronic circuitry in both the scanner and the scanner lid to maintain the light 24 in alignment with the camera. This adds additional cost to the manufacture of the device.

Furthermore, the glass platen 22 located on the scanner base 20 must include physical properties to eliminate distortion from the reflective light source below the base glass platen as well as the transmissive light source within the lid. This problem is unique to the dual transmissive and reflective scanner, because ordinary transmissive scanners do not include a glass plate in between the image and the scanner; rather they are designed to position the object to be scanned directly within the field of view of the camera to improve the image quality. The improved image quality is important to transmissive scanners, because there is a great demand for high resolution graphics reproduction.

As described above, the conventional transmissive and reflective scanners are unable to provide an unobstructed path for the transmissive scanning of objects. They also require more moving parts and increased electronic circuitry which leads to a higher manufacturing cost. Thus, the need exists for a transmissive and reflective scanner which is low in cost, easy to manufacture, and provides an unobstructed pathway for developing high quality transmissive images as well as including a reflective scanning capability.

OBJECTS AND SUMMARY OF THE INVENTION

It is an object of the present invention to provide an optical scanning apparatus for the transmissive and reflective scanning of images.

It is an additional object of the present invention to provide an optical scanning apparatus for the transmissive and reflective scanning of images using a single scanning camera.

In accordance with the objects of the present invention, a conventional scanner housing is provided with a scanning camera comprising a Charge-Coupled Device (CCD) and a fixed focus lens. At least one scanning platform is included within the scanner housing. The scanning camera also includes reflective and transmissive light sources respectively positioned to direct light upon a corresponding object. An optical pathway places objects to be scanned within the field of view of the scanning camera. The scanning camera further includes a movable camera chassis for supporting the CCD, optical pathway and transmissive and reflective light sources thereon. In this manner the scanning camera can be moved to scan across reflective or transmissive images illuminated by the respective light sources.

The scanning camera and reflective light source are located on rails and incrementally move along the rails to scan the object line by line. An object, such as a document or photograph, may be placed on the platen. The optical pathway is aligned with the field of view of the camera and the object. Light from the reflective light source located on the scanning camera is projected onto a portion of the object aligned with the field of view of the camera by the pathway. A digital representation of this portion of the image is then stored by the scanner. The scanning camera moves incrementally across the object repeating the process until the entire object has been scanned.

The transmissive objects, such as slides or transparencies may be scanned in a similar manner. The optical pathway is aligned with the transmissive object and the field of view of the scanning camera. The transmissive light source is activated and the transmissive object maybe scanned in the same manner as the reflective object.

The optical pathway may be fixed or adjustable. In one preferred embodiment the pathway includes a reflective pathway and a transmissive pathway. The respective pathway is selected by an optical switch.

The optical switch is a mirror which may be selectively positioned within the field of view of the scanning camera to redirect the view of the scanning camera between the reflective scanning platform and the transmissive scanning platform. By positioning the mirror to change the location of objects viewed by the scanning camera, two separately designed scanning platforms may be used by the same scanning camera. The optical switch provides for the scanning of reflective and transmissive objects using separate scanning platforms, each of which is tailored to achieve the optimal scanning environment for the respective types of images. The optical switch and optical pathway achieves this dual scanning capability with a minimal number of additional parts. Other features and advantages of this invention will be made apparent upon review of the drawings and detailed description of the invention.

BRIEF DESCRIPTION OF THE DRAWINGS

The objects and advantages of the present invention will become more readily apparent to those ordinarily skilled in the art after viewing the following detailed description and accompanying drawings wherein:

FIG. 1 is a perspective view of the optical scanner of the present invention;

FIG. 2 is a cut-away side view of the optical scanner of FIG. 1 taken along line 2—2 showing a scanning camera;

FIG. 6a is perspective partial view of a moving scanning camera of FIG. 3 showing an optical switch configured for scanning an opaque object;

FIG. 6b is a perspective partial view of a moving scanning camera of FIG. 3 showing the optical switch transitioning between scanning modes;

FIG. 6c is a perspective partial view of a moving scanning camera of FIG. 3 showing the optical switch configured for scanning a transparent object;

FIG. 10 is a perspective view of an alternative embodiment of the present invention;

FIG. 11 is an integral side view of the present invention;

FIG. 14 is a perspective view of an alternative embodiment of the present invention;

DETAILED DESCRIPTION

Figure 17:
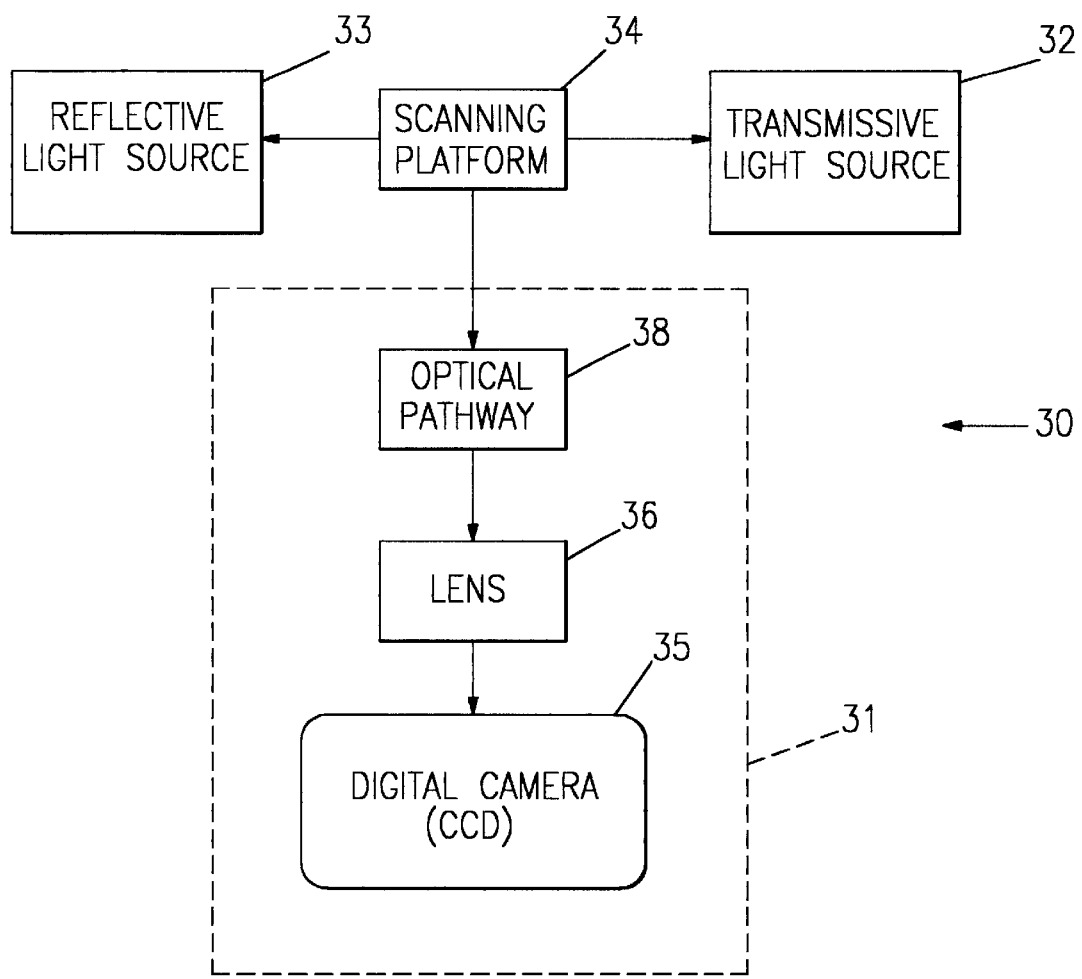
FIG. 17 is a block diagram of a scanner of the present invention.

With reference to the figures for purposes of illustration, the present invention is generally a transmissive and reflective optical scanner as illustrated in FIG. 17. The scanner 30 includes generally a scanning camera 31, a transmissive light source 32 and a reflection light source 33, and at least one scanning platform 34. The scanner 30 conventionally connects to a power source and a personal computer (not shown). Used in a conventional manner, the personal computer receives digital data representative of the image scanned by the optical scanner.

Advantageously, the scanning camera 31 of the present invention is provided with light sources 33 and 32 and secured to and included in the scanning camera 31. A digital camera (CCD) 35 and lens 36 are aligned with at least one of the light sources 32–33 and the object to be scanned by means of an optical pathway 38. The combination of a scanning camera having both reflective and transmissive light sources 32–33 secured to the camera ensures that the alignment between these elements is maintained. As will be disclosed in greater detail, three preferred embodiments which utilize this useful combination are disclosed.

Dual Scanning Platform Embodiment

Figure 7:
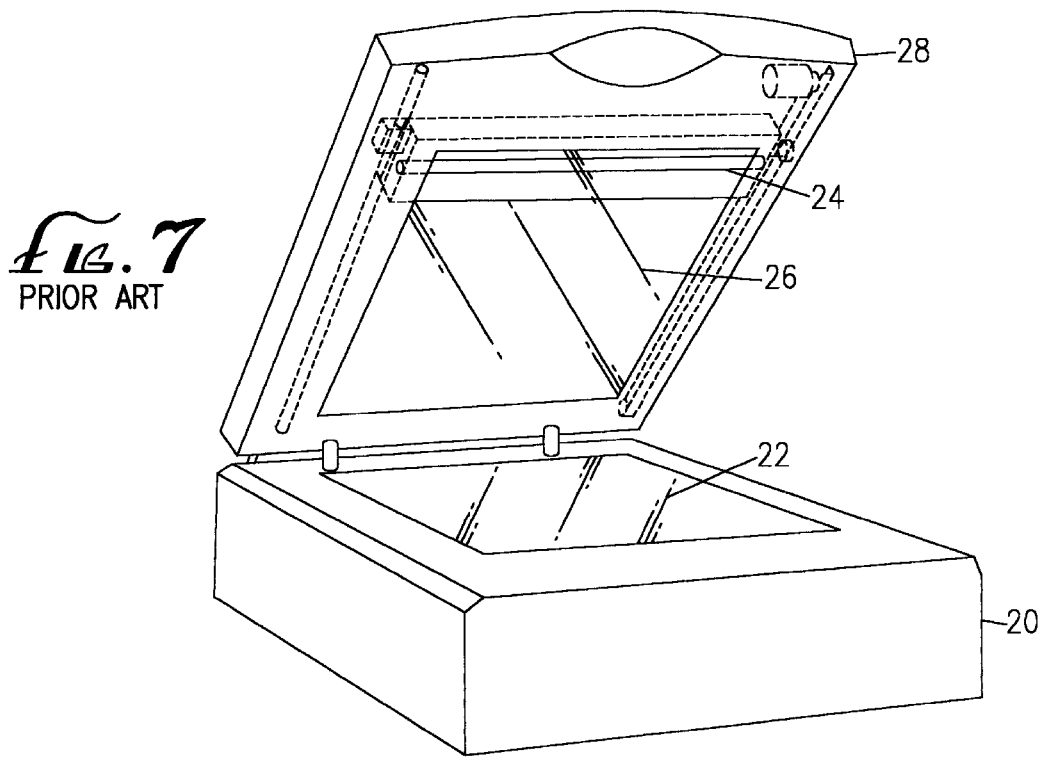
FIG. 7 is a perspective view of a conventional optical scanner.
Figure 3:
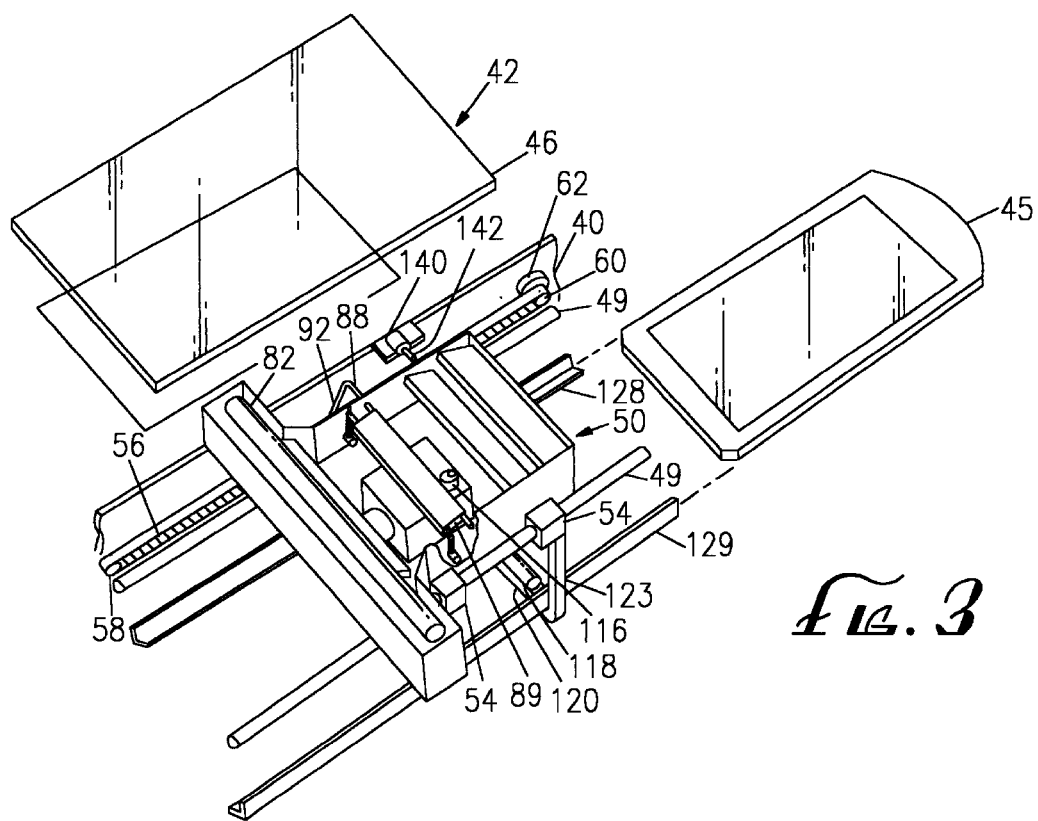
FIG. 3 is an exploded, partial perspective view of the scanning camera of FIG. 2.

With reference to FIGS. 1 and 3, the first embodiment of a transmissive and reflective scanner includes generally a rectangular housing 40 with a reflective scanning platform 42 and a docking port 44 to secure a transmissive scanning platform 45. The reflective scanning platform 42 consists of a rectangular glass platen 46 secured in an aperture within the upper surface of the housing. A lid 48, attached by a hinge to the rear end of the housing may be rotatably positioned to overlie the glass platen 46 to block out ambient light. The reflective scanning platform as described is conventional in design.

Underlying the reflective scanning platform and secured to rails 49 running lengthwise along an interior cavity within the housing is the scanning camera 50 (FIGS. 2 and 3). The scanning camera 50 includes a camera chassis 52 which includes a plurality of collars 54 movably coupled to the rails 49. A timing belt 56 extends lengthwise alongside the rails 49 and connects at opposite ends of the rails to a free moving pulley 58 and a pulley 60 connected to the drive shaft of a conventional stepper motor 62. The chassis 52 is conventionally secured to the timing belt 56 by clamps. The stepper motor 62, electrically connected to a controller circuit 64, is responsive to the controller circuit 64 (FIG. 8) to bi-directionally rotate the timing belt 56 (FIGS. 2 and 3) and thus incrementally position the chassis 52 at any point along the rails. A CCD 66, the preferred type of opto-electric transducer, which is mounted at the lower rear end of the chassis 52 with a field of view projecting toward the front of the chassis, is aligned with a centrally located fixed-focus lens 68. The CCD 66, connected in electrical circuit with the controller circuit 64, is responsive to send electrical signals representative of the images viewed by the CCD to the controller circuit 64.

The field of view of the CCD 66, extending through the lens towards the front of the chassis, is aligned with an optical pathway 70 (FIG. 4) defined by a plurality of precisely aligned mirrors 72–75 and an optical switch 76. The mirrors 72–75 are mounted onto the chassis conventionally with rubber mounts (not shown) to protect the mirrors during movement of the scanner. The mirrors, designed conventionally for use in optical instruments, include a reflective surface on the side confronting the reflected light to minimize any distortion that would occur if light is reflected through the glass to a reflective surface on the backside. The optical pathway functions as a periscope with the mirrors configured to provide remote viewing of an image by the CCD. The main portion 78 of the optical pathway receives light shifted into an upper horizontal portion of the chassis. The light is reflected from two parallel mirrors 72–73. A top mirror 73 reflects light downward towards a bottom mirror 72 that restores the light to a horizontal direction through the lens to the CCD or digital camera. For reflective scanning, light enters the upper horizontal portion of the chassis from a reflective branch segment 80 of the optical pathway. The reflective branch segment 80 includes an upper tubular fluorescent lamp 82 that is mounted on the upper side of the chassis to project light at an acute angle up through a portion of the glass platen 46 included in the reflective scanning platform. A reflective scanning mirror 74, directly underlying the illuminated portion of the glass platen, shifts light projecting downward from the reflective scanning platform into the upper horizontal portion of the chassis towards the main portion of the optical pathway. Thus a document or photograph placed on top of the glass platen 46 is illuminated by the upper light bulb 82. The reflected light is then shifted through the optical pathway for remote viewing by the CCD. It will be appreciated by those skilled in the art that the position of the light source at an acute angle in relation to the position of the reflective scanning mirror minimizes any distortion caused by refraction of the light from the object scanned passing through the glass platen 46.

Figure 4:
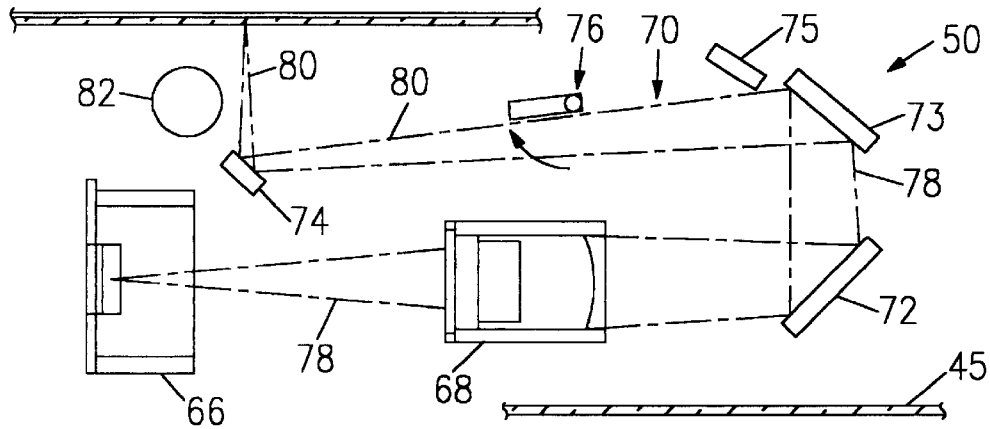
FIG. 4 is a diagrammatic side view of the scanning camera of the present invention showing the optical scanning of an opaque object.
Figure 5:
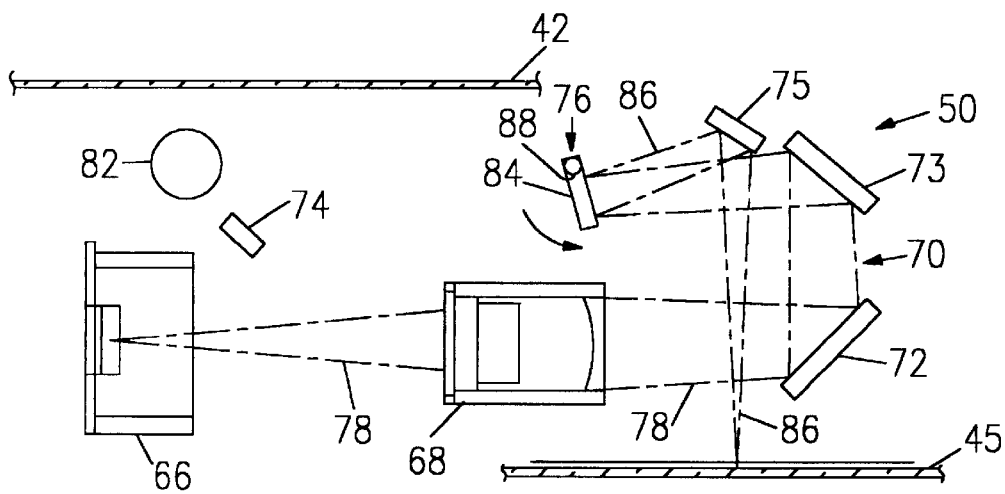
FIG. 5 is a diagrammatic side view of the scanning camera of the present invention showing the optical scanning of a transparent object.

Movably positioned within the upper horizontal portion of the chassis is the optical switch 76. Referring to FIGS. 4–6, the optical switch 76 includes a moveable switch mirror 84 which maybe positioned in the upper horizontal portion of the chassis to face the main portion of the optical pathway to shift light from a transmissive branch segment 86 of the optical pathway towards the main portion of the optical pathway. When positioned to permit viewing of the transmissive scanning platform, light from the reflective branch segment is blocked by the switch mirror 84. The optical switch 76, rotatably coupled to the chassis, includes an axle 88 which extends width-wise across the chassis and projects through apertures 90 and 91 in side walls contained within the chassis. The axle includes a free end 92 which extends away from the chassis and bends at a right angle to extend downward into the cavity of the scanner housing. A frame 94, housing the switch mirror, is rigidly mounted to the axle along its lengthwise edge 96. The frame, positioned in spaced apart relation in between the opposing chassis side walls, includes a pair of spring loaded feed pistons 98 and 99 coupled between the chassis side walls and the lower ends 100 of the frame. The optical switch 76 is thus configured to toggle the switch mirror between a nearly horizontal position outside of the optical pathway for reflective scanning and a position within the optical pathway for transmissive scanning thereby changing the origin of the images viewed by the CCD.

The purpose of the feed pistons 98 and 99 is to prevent misalignment of the mirror 84 by providing sufficient force to bias the mirror at the respective reflective and transmissive positions. With reference to feed piston 99 of FIGS. 6a–c, the feed pistons of the preferred embodiment include a piston rod 110 having a pivot pin 102 formed at its lower end that is rotatably coupled to the chassis side wall. A flat head stop 104 is formed at the upper free end of the piston. Coupled to the lower end corner 106 of the frame, the lower end being radially distant from the axle, a second rotatable pivot pin 108 includes a collar 110 that is coupled about the shaft of the piston rod and moves telescopically along the shaft. A loaded coil spring 112 is mounted concentrically about the piston shaft between the piston lower end and the collar. The loaded coil spring 112 applies a force along the piston shaft and against the collar in the direction of the piston free end. This force is translated into a torque about the switch axle 88 thereby causing the lower end of the frame to rotate about the axle in the direction of the free end of the piston. It should be noted that when the piston free end is directed towards the axle, there is no angular momentum about the axle generated by the force of coil spring.

The angular displacement of the mirror during rotation about the axle is limited by stops 104, 114 and 116 which prevent further rotation of the mirror. A pair of reflective scanning stops 104 and 114, each located at the free end of the piston rods, stops the rearward clockwise rotation of the mirror at the nearly horizontal position for reflective scanning. A transmissive scanning stop 116, located on the upper surface of the lens and CCD housing, stops the forward counter-clockwise rotation of the mirror lower end to shift light from the transmissive branch segment towards the main portion of the optical pathway. The transmissive scanning stop 116 includes a plastic washer 117 mounted by a screw 119 to the lens housing. The mounting point and washer diameter are calculated to stop the switch mirror in precise alignment with the transmissive and main optical pathway. The feed pistons, mirror and stops cooperate to form an optical switch for toggling the scanning mode between reflective and transmissive scanning.

The transmissive branch segment includes a lower tubular fluorescent lamp 118 (FIG. 3) secured on a light fixture 120 underlying the chassis in spaced apart relation thereto. The light fixture and bulb extend width-wise under the chassis between a pair of mounting brackets 122–123 that secure the underlying fixture to the under side of the chassis. This lower light bulb 118 projects light up through the portion of transmissive scanning platform 45 directly overlying the light source. A transmissive scanning mirror 75 (FIG. 5), directly overlying the illuminated portion of the transmissive platform, shifts light from the transmissive scanning platform onto the switch mirror 84 which in turn shifts the light towards the main portion of the optical pathway. Thus, a slide or transparency placed on the transmissive scanning platform is illuminated by the lower light bulb 118. The transmitted light is then shifted through the optical pathway for remote viewing by the CCD. Because the light from the illuminated transmissive object entering the optical pathway is not obstructed by glass or other objects having an index of refraction which differs from the ambient air, it will be appreciated by those skilled in the art that distortion of the image due optical interference is minimized.

The transmissive platform 45 is removably positioned on a pair of docking tracks 128 and 129 (FIG. 3) which run lengthwise through the scanner housing in parallel with the rails. The docking tracks extend through a gap formed between the chassis and the lower light source. The transmissive scanning platform 45 is inserted through a docking port 44 on the front side of the scanner housing along the docking tracks. An optional hood (not shown) attached by a hinge to the front of the scanner may be lowered to cover the docking port 44 to eliminate any ambient light. The transmissive scanning platform 45 provides a secure holder for a transparency or slide. Such transmissive platforms come in a variety of configurations, each such platform configuration is tailored to the specific type transparent media to be scanned. Examples of transmissive platforms fit for this purpose are disclosed in U.S. patent application Ser. No. 08/228,736 incorporated herein by reference.

Figure 8:
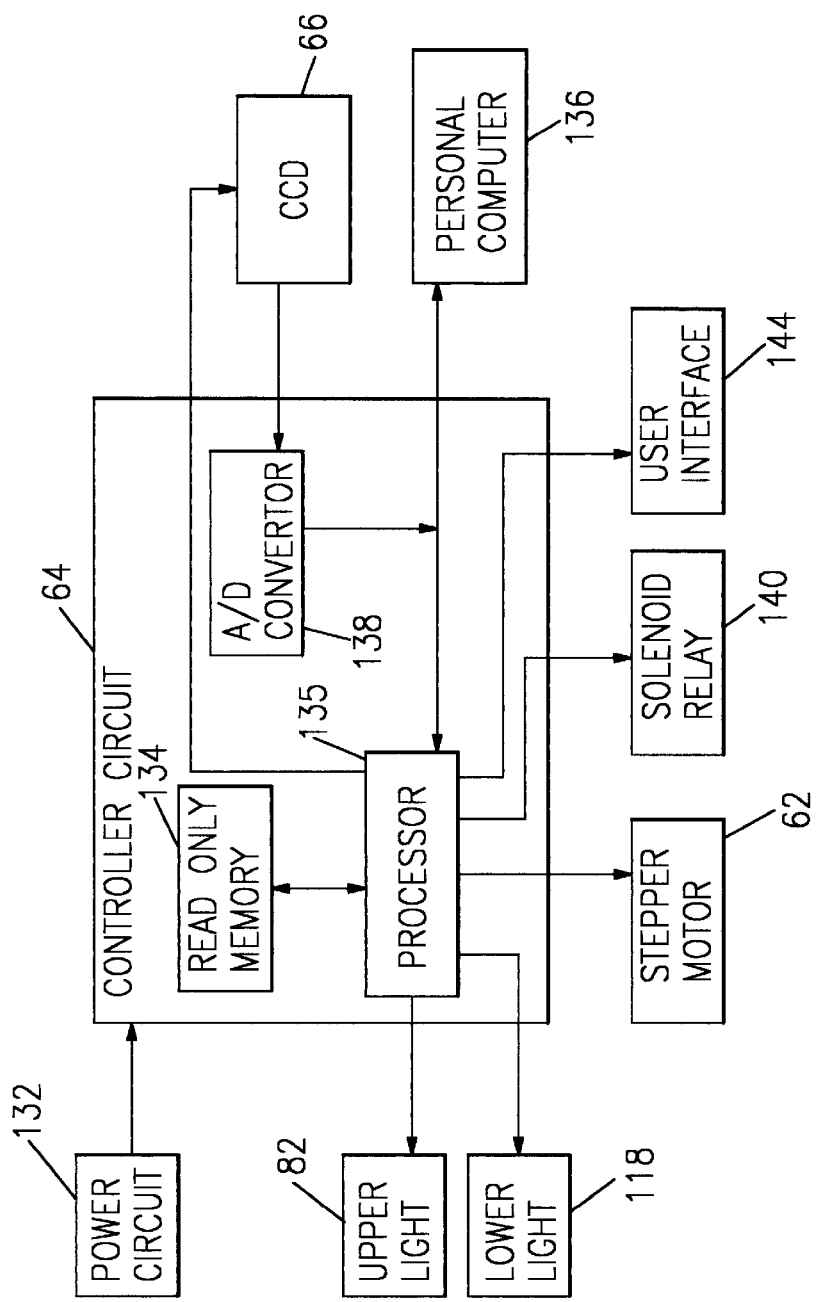
FIG. 8 is a block diagram of a controller circuit of the present invention.

Contained within the housing are a conventional power circuit 132 (FIG. 8) connected to the controller circuit. The controller circuit 64 includes a Read Only Memory (ROM) for storing a scanner operation program that is operated by a processor 135 to conventionally control the light sources 82 and 118, drive motor 62 and CCD 66 and to communicate with the personal computer (PC) 136 as shown in FIG. 8. The control circuit also includes analog to digital (A/D) convertors 138 connected to the CCD 66. The A/D convertors 138 convert the analog signals into a digital form. Conventional digital signal processing techniques may then be applied to the scanned image data by the scanner CPU to enhance the image. The image data is then sent to the PC 136 for storage. The hardware configurations for these circuits may be of any conventionally available type presently used in conventional scanners and are largely dependent upon the type digital camera used.

Connected in circuit to an interrupt lead within the controller circuit is a solenoid relay 140 (FIG. 6c). The solenoid relay 140, also known as a plunger relay, includes a moveable core 142 or plunger that extends out of one end of the solenoid relay in response solenoid action caused by an electrical current sent from the controller circuit 64 to the solenoid relay. When the controller circuit stops power to the solenoid relay, the moveable core 142 is drawn back into the solenoid 140. The moveable core of the solenoid relay is used to electronically toggle the optical switch 76. The free end 92 of the switch axle extends down into the scanner housing away from the chassis. When the chassis is drawn across the rails 49, the free end 92 of the axle travels through the scanner housing alongside the chassis. The solenoid 140 is mounted within the scanner housing, such that the movable core 142, when extended, will intersect the free arm 92 of the axle. Thus, when the free arm of the axle engages the solenoid relay while the chassis is moving, the free arm will rotate the axle to overcome the force of the loaded spring and to cause the switch mirror to rotate. Upon the piston rods passing through the zero torque position. The direction of the torque reverses and the force provided by the feed pistons rotates the mirror until it engages the stops 104, 114 and 116. Operation of the solenoid 140 and control of the two light sources is accomplished by means of a platform selection subroutine included within the scanner firmware stored in the controller circuit ROM 134. A button included on the surface of the scanner or represented by a prompt within commercial software included with the personal computer provides a user interface 144 which allows the operator to activate the platform selection subroutine to select a desired scanning platform.

Figure 9:
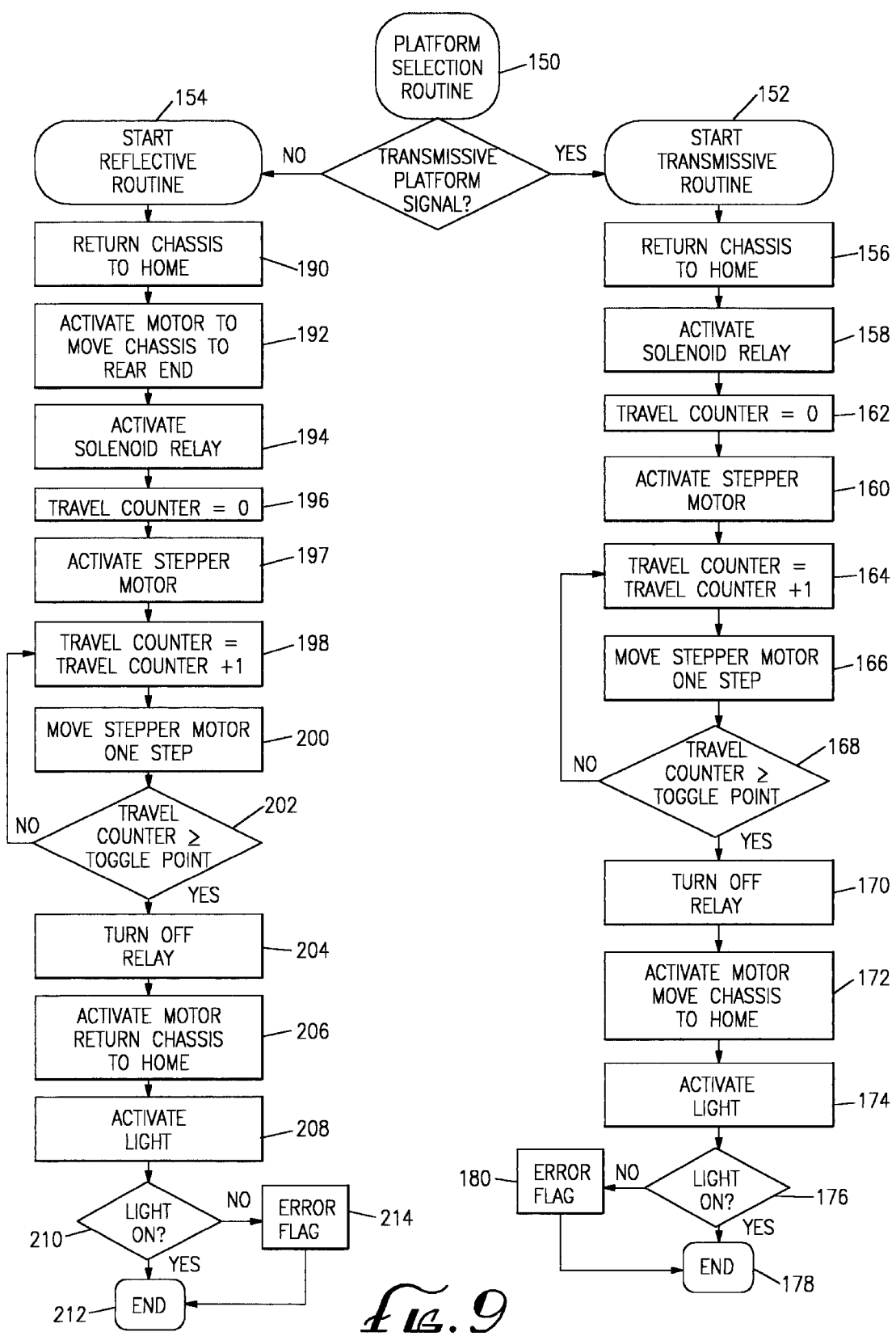
FIG. 9 is a flow diagram of a platform selection routine of the present invention.

Before operation of the scanner as described above, the scanner is connected to a conventional power outlet and to a personal computer 136 having commercial scanning software capable of operating with the scanner. Because the scanner includes two scanning platforms 42 and 45, the conventional scanning operation can only occur after selection of either the transmissive or reflective scanning platform. In the preferred embodiment, the selection of the scanning platform is made by the operator using the user interface 144, such as a button or switch located on the scanner or by means of a software setting added to the software within the personal computer. A selection signal is sent to the processor 135 of the controller circuit which in response activates the platform selection routine 150 (FIG. 9). The selection signal must be capable signaling the CPU at two signal levels. A first signal level indicating selection of the transmissive platform and a second level indicating selection of the reflective platform. The platform selection routine 150 includes a transmissive platform routine 152 and a reflective platform routine 154.

The transmissive routine 152 activates the stepper motor to return the chassis to a home position along the rails proximate to the front end of the scanner 156. The solenoid relay is activated 158 to extend the core out into the path of the axle free end. The stepper motor 62 is then activated 160 to move the chassis along the rails 49 towards the back end. A travel counter is initialized 162 and tracks the movement of the chassis along the rails by counting 164 the incremental rotation 166 of the stepper motor drive shaft which is two hundred (200) steps per rotation in the preferred embodiment. The chassis moves along the rails towards the rear of the scanner housing. If the optical switch is configured for reflective scanning the free end 92 of the axle will engage solenoid core 142 (FIG. 6c). As the chassis moves towards the rear end of the scanner housing, the movement of free end of the axle engages the solenoid relay. By engaging the solenoid relay, the axle free end overcomes the biasing force of the loaded spring and rotates the mirror towards the transmissive scanning position. As the chassis continues to move along the rails 49, a toggle point is reached when the torque generated by the biasing force is reversed. After passing the toggle point, the feed pistons 98 and 99 push the free end of the mirror towards the transmissive platform stop 116. Upon the counter reaching a value indicating that the toggle point has been reached 168, the solenoid is turned off 170. The chassis then returns to the home position 172. The lower light source is then turned on 174. If the mirror is properly positioned and the light is working, light is transmitted through the transmissive branch segment 86 and shifted by the optical switch into the main pathway towards the lens and CCD. The control circuit then checks the CCD to ensure that the light is being received 176. If the light is received, the scanner can then begin conventional scanning from the transmissive scanner platform 178. Otherwise, an error message is generated 180 indicating that the light from the lower light source has not been received. It will be appreciated that if the mirror is already positioned for transmissive scanning, the free end of the axle will not contact the solenoid during the period that the solenoid is extended as the core is withdrawn upon passing the toggle point.

The reflective routine 154 also activates the stepper motor to return the chassis to a home position 190 along the rails proximate to the front end of the scanner. The stepper motor is then activated to move the chassis along the rails towards the rear end of the housing 192. Upon reaching the rear end of the scanner housing, the solenoid relay is activated 194 to extend the core out into the path of the axle free end. The travel counter is initialized 196 and the chassis then returns along the rails towards the home position. A counter tracks the movement of the chassis along the rails by counting the incremental rotation of the stepper motor drive shaft 198. The chassis moves along the rails towards the front of the scanner housing 200. If the optical switch is configured for transmissive scanning, the free end of the axle will contact solenoid core. As the chassis moves towards the front end of the scanner housing, the free end of the axle engages the solenoid relay. By engaging the solenoid relay, the axle free end over comes the biasing force of the loaded spring and rotates the mirror towards the reflective scanning position. As the chassis continues to move along the rails, a toggle point is reached when the torque generated by the biasing force is reversed. After passing the toggle point, the feed pistons push the free end of the mirror towards the reflective platform stops. Upon the counter reaching a value indicating that the toggle point has been reached 202, the solenoid is turned off 204. The chassis continues to the front end of the housing 206. The upper light source is then turned on 208. If the mirror is properly positioned out of the optical pathway and the light is working, light is transmitted through the reflective branch segment into the main pathway towards the lens and CCD. The control circuit then checks the CCD to ensure that the light is being received 210. If the light is received, the scanner can then begin conventional scanning from the reflective scanner platform 212. Otherwise, an error message is generated 214 indicating that the light from the upper light source has not been received.

Once the transmissive or reflective scanning platform has been selected, the scanner is ready to scan documents on that platform in a conventional manner. If the scanner is configured to shift light from the reflective scanner towards the lens and CCD, a document or photograph is placed on the glass platen. The lid is closed, the upper lamp is activated and the stepper motor incrementally draws the chassis under the glass platen. If the scanner is configured to shift light from the transmissive scanner towards the lens and CCD, a transparency or slide is placed on the transmissive platform. The transmissive platform is inserted into the docking port along the docking track and the hood is closed. The lower lamp is activated and the stepper motor incrementally draws the chassis with lamp about the transmissive platform.

It will be appreciated by those skilled in the art that the optical switch disclosed herein may be accomplished by other devices such as a one way reflective mirror which would not require rotation of the mirror. In addition if fibre optic cable is substituted for the optical pathway other optical switches known in fibre optics maybe employed to switch between the two scanning platforms. Finally, a mechanical switch deployed on the outside of the scanner could also be substituted for the present electro-mechanical switch disclosed in the preferred embodiment.

It will be appreciated by those skilled in the art that, when using a fixed focus lens, the length of the optical pathway must be the same when configured for transmissive scanning and when configured for reflective scanning.

SINGLE SCANNING PLATFORM ASSEMBLY EMBODIMENT

In a second embodiment illustrated in FIGS. 10–11, a transmissive and reflective scanner, incorporating a single scanning platform, has been adapted as a scanner assembly 302 for installation into a commercially available enclosure equipped with a computer BUS, such as the housing of a personal computer or the like. The scanner assembly 302, when adapted for installation into a computer enclosure, includes a housing 304 sized and shaped to correspond to the dimensions of a conventional 5¼ inch floppy disk drive. The scanner assembly 302 includes ports (not shown) configured to connect to and operate with conventional computer bus standards, such as SCSI or IDE.

The front face 306 of the housing 304 (FIG. 10) includes an aperture defined by edges 308 located centrally in the front face 306 for a docking port 310 and surrounding the aperture a power-on indicator light 312, a scan ready indicator light 314, a scanning platform eject button 316, and reflective and transmissive scan selection buttons 318–319. These indicators and buttons cooperate to form a user interface on the front face 306 of the housing which allows the user monitor and control the scanner operation.

With reference to FIGS. 10 and 11, the scanner assembly includes a scanning camera 322 mounted on rails 324 and movable within the scanner housing 304 by means of a stepper motor 326 mounted within the housing 304. A timing belt 328 connected to the scanning camera 322 is driven by the stepper motor 326 causing the scanning camera 322 to move along the length of the rails 324. The scanning camera 322 and the stepper motor 326 are controlled by a controller circuit (not shown) which cooperates with conventional software to perform scanning of an object.

Figure 13:
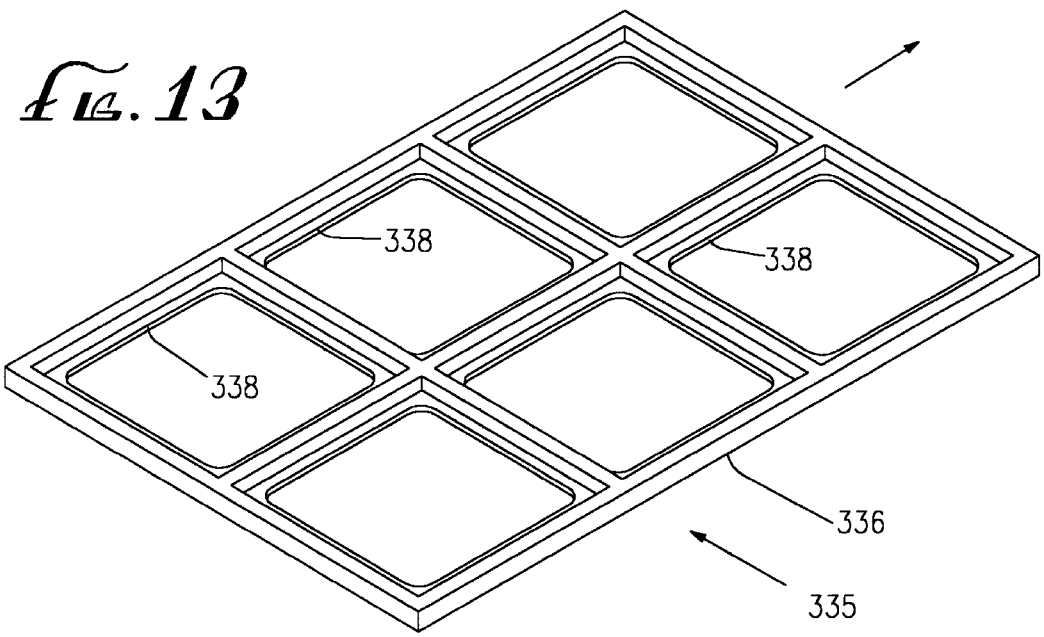
FIG. 13 is a perspective view of a scanning platform adapted to hold slides.
Figure 12:
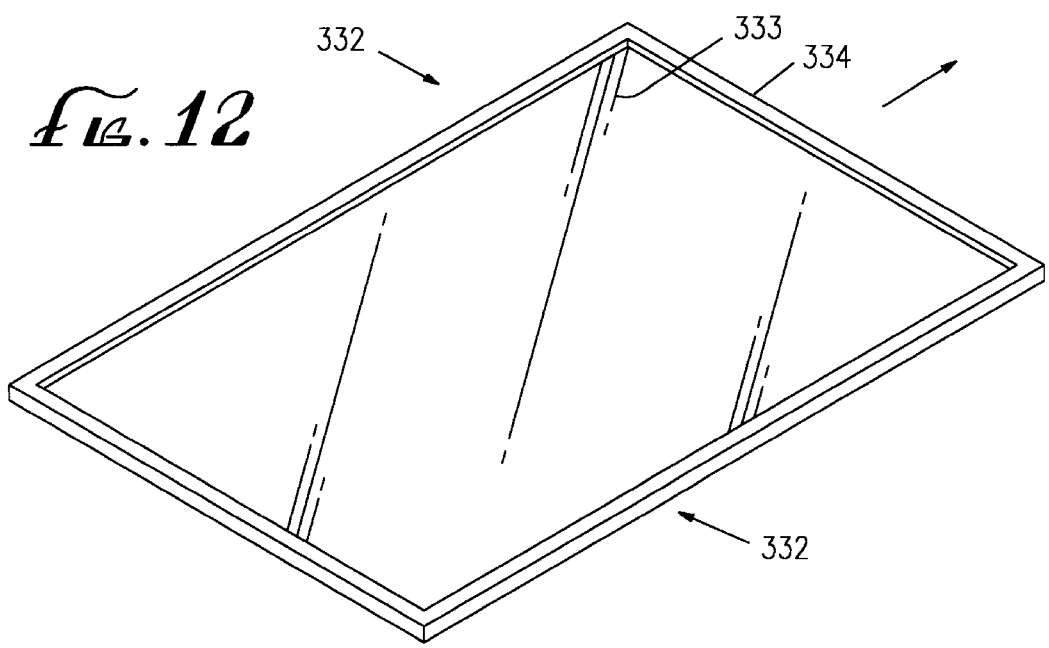
FIG. 12 is a perspective view of a scanning platform adapted to hold translucent and/or opaque objects.

In general, the scanning platform configuration varies depending on whether the object is a transparency, slide, document or photograph, but preferably secures the object so as to prevent contact with the scanner assembly. Referring now to FIGS. 10, 12 and 13, such scanning platform 331 (FIG. 10), removably received within the assembly through the docking port 310, are adapted to support either transparent or reflective objects on the platform. Such platforms, as described in the preferred embodiment above, come in a variety of configurations, each such platform configuration is preferably tailored to the specific type of media to be scanned. A preferred scanning platform 332 (FIG. 12) for both transmissive and reflective scanning includes a transparent platen 333 surrounded by a frame 334 adapted to be received by the docking port 310. Other examples of transmissive platforms fit for this purpose are disclosed in U.S. patent application Ser. No. 08/228,736. The scanner platform for this embodiment, when installed in a personal computer enclosure, is preferably 4×6 inches. A platform of this size may be the preferred scanning platform 332 configured with a platen to hold one large 4×6 inch photograph (FIG. 12) or an alternatively preferred scanning platform 335 including a tray adapted within insets 338 to support a set of slides (FIG. 13), such as the 35 mm slide type.

The docking port 310 includes opposing C-shaped guides 336 that extend from opposite ends of the aperture and extend along the length of the scanner assembly housing 304 to receive the scanning platform within the opposing C-shaped sleeves when inserted for scanning. The scanning platform 331 (FIG. 10) is preferably manually inserted into the scanner and a conventional spring loaded release (not shown) is activated by the eject button (FIG. 10) to eject the platform from the scanner assembly. Manual insertion of the platform 331 is preferred, because this method allows the user to inspect the object in relation to the platform 331 and the defining edges 308 of the aperture during the insertion process to prevent contact between the object and the docking port edges. The spring loaded release is conventional of the type used to eject conventional 3½" disk drives. The locking/eject mechanism (not shown) and guides 336 when used in this manner securely hold the platform 331 and an object secured to the platform stationary during scanning. By maintaining the platform 331 and object stationary during scanning, the chance of misalignment of the object and platform is minimized.

As with the dual scanning platform embodiment (FIGS. 1–9), the scanning camera 322 of the single scanning platform embodiment (FIGS. 10–11) includes a camera chassis 338 onto which a CCD 340 is securely mounted. A lens 342 and plurality of mirrors 344–346 are arranged to form an optical pathway to optically align a portion of the scanning platform 331 with the CCD 340. Unlike the dual scanning platform embodiment, which required separate reflective and transmissive optical pathways, the optical pathway of the single platform scanner 300 is the same. The camera chassis 338 includes both the reflective and transmissive light sources 348–349 mounted on the underside of the chassis to direct light toward the single scanning platform.

The platform 331 and guides 336 are received through an aperture in the camera chassis 338. The aperture is formed from the transmissive light fixture supports 352–353 which extend down opposite sides of the chassis 338. The upper portion of the aperture is defined by the reflective light fixture 356 and the lower portion of the aperture is defined by the transmissive light fixture 358. Above the scanning platform is the CCD 340, lens 342 and mirrors 344–346 aligned to view the upper surface of the scanning platform 331. Objects placed upon the upper surface of the scanning platform 331 are illuminated by either the reflective or transmissive light sources 348–349. The selection of the reflective or transmissive light source 348–349 is accomplished by the user. A conventional electrical circuit (not shown) provides power to the transmissive and reflective light sources through the transmissive and reflective buttons 318–319 of the user interface. The buttons 318–319 allow the user to select either the transmissive or reflective light source 348–349. The light sources are capable of being activated by the controller circuit (not shown). In this configuration, a conventional flip-flop logic circuit (not shown) receives input from the controller circuit (not shown) to activate either the reflective or transmissive light source 348–349. In this embodiment, conventional software loaded within the personal computer connected to the controller circuit can signal the controller circuit (not shown) to activate either the transmissive or reflective light source 348–349. Alternatively, the transmissive and reflective selection buttons 319 and 318 connect to the controller circuit to cause activation of the flip-flop.

In the operation of the single platform scanner, there is no need to configure the optical pathway defined by mirrors 344–346. The operator selects a desired platform holder 331 according to the type of media desired to be scanned. The object (not shown) is placed on the platform 331 in a manner to secure the object on the platform 331 and to inspect the object to ensure the desired image to scan is visible from the upper surface 360 of the platform 331. The platform is inserted manually into the docking port 310 and the operator manually checks to ensure that the object does not touch the scanner housing 364. This check ensures that the object will not contact the scanning camera 322 when it is activated. The power-on indicator light 312 should indicate that scanning camera is powered-on and ready for operation. Once the platform 331 is fully inserted, the operator selects the desired transmissive or reflective light source according to the properties of the object inserted using a software prompt or the reflective and transmissive select buttons 318–319. The device then scans the object conventionally. During scanning the scanning indicator light should blink "on" and "off" to indicate that the scanner is operating properly. Upon completion of the scanning operation, the eject button 316 is pushed. The light spring mechanism (not shown) partially pushes the platform 331 out of the docking port 310. The release of the platform 331 should be sufficient to allow for a portion of the platform 331 to be grasped by a hand.

SINGLE SCANNING PLATFORM LARGE SCALE EMBODIMENT

Figure 15:
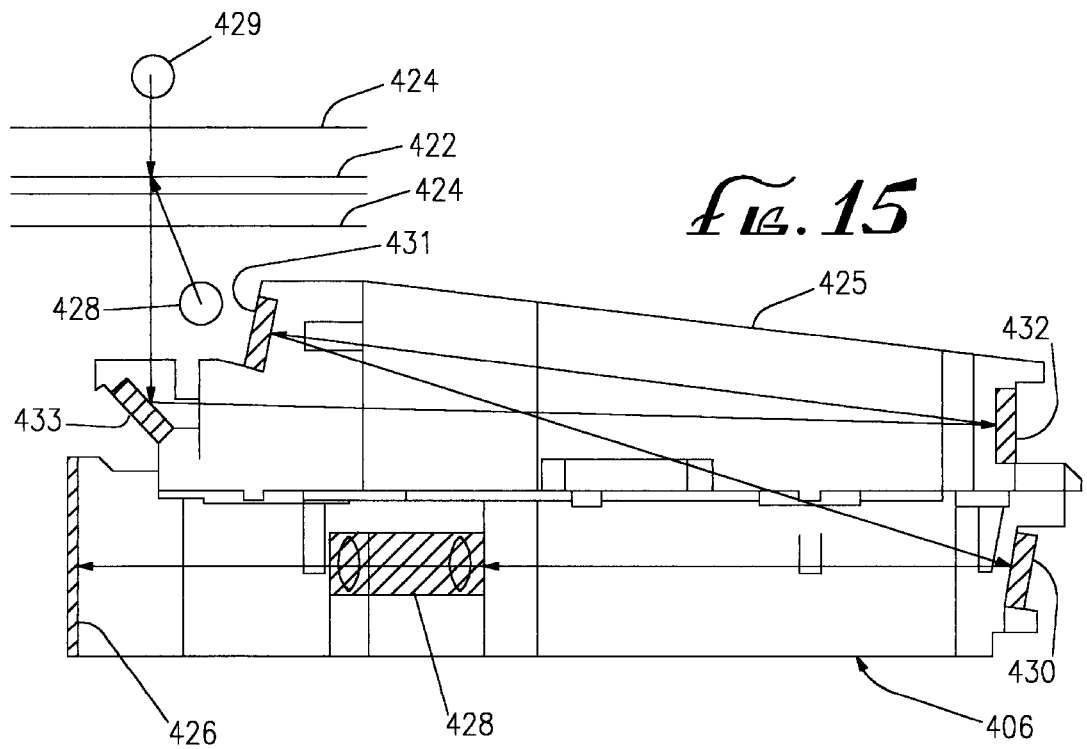
FIG. 15 is a side view of a scanning camera of the alternative embodiment of FIG. 14.
Figure 16:
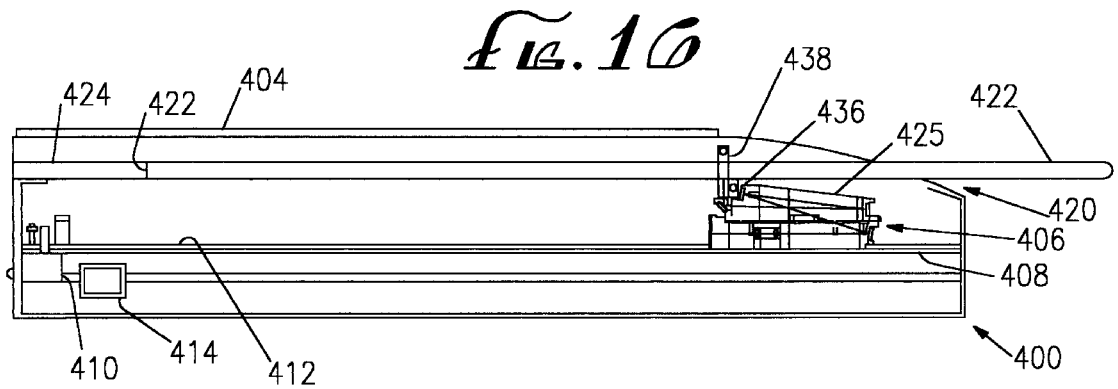
FIG. 16 is an internal side view of the alternative embodiment of FIG. 14.

In a second embodiment illustrated in FIGS. 14–16, a transmissive and reflective scanner 400, incorporating a single scanning platform 402, has been adapted as a stand-alone scanner as a flat bed type scanner. The scanner 400 includes a housing 404 sized and shaped to conform to receive standard 8.5×11 inch or A-4 paper stock. The scanner housing 404 includes ports (not shown) configured to connect to a conventional computer and power source.

A user interface (not shown) may also be included in the front face 416.

With reference to FIGS. 15–16, the scanner 400 includes a scanning camera 406 mounted on rails 408 and movable within the scanner housing 404 by means of a stepper motor 410 mounted within the housing 404. A cog belt 412 connected to the scanning camera 406 is driven by the stepper motor 410 causing the scanning camera 406 to move along the length of the rails 408. The scanning camera 406 and the stepper motor 410 are controlled by a controller circuit 414 which cooperates with software to perform scanning of an object.

Referring now to FIGS. 14 and 16, the front face 416 of the housing (FIG. 14) includes a slot 418 forming as aperture for a docking port 420. A scanning platform, removably received within the assembly through the docking port 420, is adapted to support either transparent or reflective objects on the platform 422. The preferred scanning platform 332 (FIG. 12) for both transmissive and reflective scanning has been described above. The scanner platform, when installed in the docking port 420 enclosure, is preferably 13×10 inches. The platform 332 configured for this size may be configured with a platen to hold one business letter (FIG. 12) or a tray adapted within insets to support a set of slides (FIG. 13).

The docking port 420 includes opposing C-shaped guides 424 that extend from opposite ends of the aperture and extend along the length of the scanner housing 404 to receive the scanning platform 422 when inserted for scanning. The scanning platform is preferably manually inserted into the scanner and a conventional spring loaded lock and release mechanism (not shown) is activated by an eject button (not shown) to eject the platform from the scanner assembly. Manual insertion of the platform is preferred, because this method allows the user to inspect the object in relation to the platform and the defining edges of the docking port aperture during the insertion process to prevent contact between the object and the docking port edges. The spring loaded release is of the type used to eject conventional 3½" disk drives. The locking mechanism and guides when used in this manner securely hold the platform and an object secured to the platform stationary during scanning. By maintaining the platform and object stationary during scanning, the chance of misalignment of the object and platform is minimized.

As with the single scanning platform assembly embodiment (FIGS. 10–11), the scanning camera 406 of the present embodiment includes a camera chassis 425 onto which a CCD 426 is securely mounted. A lens 428 and plurality of mirrors 430–433 are arranged to form an optical pathway to optically align a portion of the scanning platform 422 with the CCD 426. The optical pathway is formed by four mirrors 430–433. The chassis 425 includes both the reflective and transmissive light sources 428–429 mounted on the upper-side of the chassis 425 to direct light toward the single scanning platform 422.

The platform 422 and guides 424 are received through an aperture in the moveable chassis 425. The aperture is formed from the light fixture supports 432–433 which extend upward away from opposite sides of the chassis 425. The lower portion of the aperture is defined by the reflective light fixture 436 and the upper portion of the aperture is defined by the reflective light fixture 438. Below the scanning platform 420 is the CCD 426, lens 428 and mirrors 430–433 forming the optical pathway together aligned to view the lower surface of the scanning platform 422. Objects placed upon the lower surface of the scanning camera 422 are illuminated by either the reflective or transmissive light source 428–429. The selection of the reflective or transmissive light sources is accomplished by the user. A conventional electrical circuit provides power to the transmissive and reflective light sources through the controller circuit 414. In this configuration, a conventional flip-flop logic circuit (not shown) receives input from the controller circuit 414 to activate either the reflective or transmissive light source 428–429. In this embodiment, conventional software loaded within the personal computer connected to the controller circuit 414 can signal the controller circuit to activate either the transmissive or reflective light source.

It will be understood that certain features and sub-combinations are of utility and may be employed without reference to other features and sub-combinations as they are outlined within the claims. While the preferred embodiment and application of the invention has been described, it is apparent to those skilled in the art that the objects and features of the present invention are only limited as set forth in claims attached hereto.

What is claimed is:

1. A transmissive/reflective optical scanning apparatus comprising:

a scanner housing;

a reflective scanning platform;

a transmissive scanning platform;

a scanning camera including a scanning camera chassis moveable relative to said reflective and transmissive scanning platforms and further including, mounted on said scanning camera chassis, a transmissive light source and a reflective light source, a digital camera adapted to generate electrical signals representative of the images viewed, a lens, and an optical pathway which is oriented to selectively view said platforms; and said scanning camera adapted to selectively view said platforms and generate electrical signals representative of the images viewed.

2. The scanning apparatus of claim 1 including a motor operatively connected to said scanning camera to move said scanning camera within said housing.

3. The scanning apparatus of claim 2, said scanning camera connected to said motor and adapted to control the movement of said scanning camera.

4. The scanning apparatus of claim 1 including a controller circuit connected to said scanning camera and operative to activate said scanning camera such that, upon activating said scanning camera, said scanning camera electrical signals are received.

5. The scanning apparatus of claim 4, said controller circuit connected to said motor and adapted to control the movement of said scanning camera.

6. A transmissive/reflective optical scanning apparatus comprising:

a scanner housing;

a reflective scanning platform formed in the upper surface of said scanner housing;

a transmissive scanning platform;

a scanning camera including a transmissive light source and a reflective light source, a digital camera, a lens, an optical pathway which is oriented to selectively view said platforms and generate electrical signals representative of the images viewed; and a motor operatively connected to said scanning camera to move said scanning camera as a single unit within said housing.

7. The scanning apparatus of claim 6 including a controller circuit connected to said scanning camera and operative to activate said scanning camera such that, upon activating said scanning camera, said scanning camera electrical signals are received.

8. The scanning apparatus of claim 7, said scanning camera connected to said motor and adapted to control the movement of said scanning camera.

9. The scanning apparatus of claim 8, wherein said controller circuit includes means for selectively scanning either said reflective scanning platform or said transmissive scanning platform.

10. An optical scanning apparatus comprising:

a scanner housing;

a reflective scanning platform;

a transmissive scanning platform;

a scanning camera;

said scanning camera comprising a digital camera, a reflective light source and a transmissive light source;

said scanning camera movably positioned proximate to said reflective scanning platform and oriented to selectively view one of said platforms and generate electrical signals representative of the images viewed; and a motor operatively connected to said scanning camera to move said scanning camera within said housing.

11. The scanning apparatus of claim 10, including a controller circuit connected to said scanning camera and operative to activate said scanning camera such that, upon activating said scanning camera, receiving said scanning camera electrical signals.

12. The scanning apparatus of claim 11, said scanning camera connected to said motor and adapted to control the movement of said scanning camera.

13. The scanning apparatus of claim 12, said controller circuit including means for selectively orienting said scanning camera to view either said reflective scanning platform or said transmissive scanning platform.

14. A transmissive/reflective optical scanning apparatus for retrieving digital images representative of opaque and transmissive objects comprising:

a scanner housing;

a reflective scanning platform;

a transmissive scanning platform;

a scanning camera including a digital camera, a reflective light source and a transmissive light source, each connected to move together, said scanning camera movably positioned proximate to said reflective scanning platform and oriented to selectively view said platforms and generate electrical signals representative of the images viewed; and a motor operatively connected to said scanning camera to move said scanning camera within said housing a controller circuit connected to said scanning camera and operative to activate said scanning camera such that, after activating said scanning camera, receiving said scanning camera electrical signals.

15. The scanning apparatus of claim 14, said controller circuit connected to said motor and adapted to control the movement of said scanning camera.

16. A transmissive/reflective scanning apparatus comprising:

a scanner housing;

a reflective scanning platform;
a transmissive scanning platform;
a scanning camera including:
  a chassis;
  a digital camera;
  a lens;
  a reflective scanning light source;
  a transmissive scanning light source; and
  an optical pathway;
  said digital camera, said lens, said reflective and transmissive light sources each connected to said chassis; and
a controller circuit connected to said scanning camera and adapted to receive scanning camera electrical signals; and
said digital camera being aligned with said lens to view images from said optical pathway and said optical pathway being selectively aligned with said reflective scanning platform in a reflective scanning mode such that said control circuit receives images representative of said opaque object and being selectively aligned with said transmissive scanning platform in a transmissive scanning mode such that said control circuit receives images representative of said transmissive object.

17. An optical scanning apparatus comprising:
at least one scanning platform;
a scanning camera including:
  a chassis;
  a digital camera;
  a lens;
  a reflective scanning light source;
  a transmissive scanning light source; and
  an optical pathway;
  said digital camera, said lens, said reflective and transmissive light sources each connected to said chassis such that light generated by said reflective light source is reflected off said at least one scanning platform and transmitted through said optical pathway and lens to said digital camera.

18. The scanning apparatus of claim 17, wherein light generated by said transmissive light source is reflected off said at least one scanning platform and transmitted through said optical pathway and lens to said digital camera.

19. An optical scanning apparatus comprising:
at least one scanning platform;
a scanning camera including:
  a chassis;
  a digital camera;
  a lens;
  a reflective scanning light source;
  a transmissive scanning light source; and
  an optical pathway;
  said digital camera, said lens, said reflective and transmissive light sources each connected to said chassis such that light generated by said transmissive light source is reflected off said at least one scanning platform and transmitted through said optical pathway and lens to said digital camera.

20. The scanning apparatus of claim 19, wherein light generated by said light source is reflected off said at least one scanning platform and transmitted through said optical pathway and lens to said digital camera.

* * * * *